United States Patent [19]

Kawamura et al.

[11] Patent Number: 5,357,310
[45] Date of Patent: Oct. 18, 1994

[54] CORRELATION PHASE DIFFERENCE TYPE FOCUS DETECTING INTERPOLATION

[75] Inventors: Kazuo Kawamura, Asaka; Takashi Miida, Kanagawa; Hiroshi Iwabuchi, Kanagawa; Jun Hasegawa, Kanagawa, all of Japan

[73] Assignee: Fuji Photo Film Co., Ltd., Kanagawa, Japan

[21] Appl. No.: 187,136

[22] Filed: Jan. 27, 1994

Related U.S. Application Data

[63] Continuation of Ser. No. 900,284, Jun. 18, 1992, abandoned.

[30] Foreign Application Priority Data

Jun. 20, 1991 [JP] Japan .................................. 3-148888

[51] Int. Cl.$^5$ .......................... G03B 3/00; G01C 3/08; G01J 1/20
[52] U.S. Cl. ........................................ 354/408; 356/4; 250/201.8
[58] Field of Search ................ 354/406, 407, 408, 402; 356/4; 250/201.8

[56] References Cited

U.S. PATENT DOCUMENTS

| | | | |
|---|---|---|---|
| 4,956,660 | 9/1990 | Takahashi | 354/408 X |
| 5,093,562 | 3/1992 | Okisu et al. | 354/408 X |
| 5,107,291 | 4/1992 | Ishida et al. | 354/406 |
| 5,159,383 | 10/1992 | Ishida et al. | 354/406 |

Primary Examiner—David M. Gray
Assistant Examiner—Jae N. Noh
Attorney, Agent, or Firm—Sughrue, Mion, Zinn, Macpeak & Seas

[57] ABSTRACT

A pair of optical systems of the same characteristics are disposed spaced apart by a base line length in the direction perpendicular to an optical axis, to form a focal plane, on which a standard photosensor and a reference photosensor, each having a plurality of photosensor elements, are disposed. An image of an object is focused onto the standard and reference photosensors, to generate a standard optical signal and a reference optical signal which are compared with each other, while changing the phase of the reference optical signal relative to the phase of the standard optical signal to calculate correlation factors. A distance to the object is detected from a phase having an extreme value of the calculated correlation factors. If the calculated correlation factors are asymmetrical relative to the extreme value, one correlation factor change by a unit phase shift before the extreme value is subtracted from the other correlation factor change by the unit phase shift after the extreme value. The subtraction result is divided by a constant. The division result is added to the correlation factors at sampling points adjacent the extreme value on the side of the other correlation factor change. The addition results are used as the corrected correlation factors, to perform an interpolation calculation to obtain a phase having an extreme value of the corrected correlation factors.

12 Claims, 8 Drawing Sheets

CORRELATION CURVE

NOISE A $\alpha - \beta = 3S, \quad S = \dfrac{\alpha - \beta}{3}$

NOISE B $\alpha - \beta = 8t, \quad t = \dfrac{\alpha - \beta}{8}$

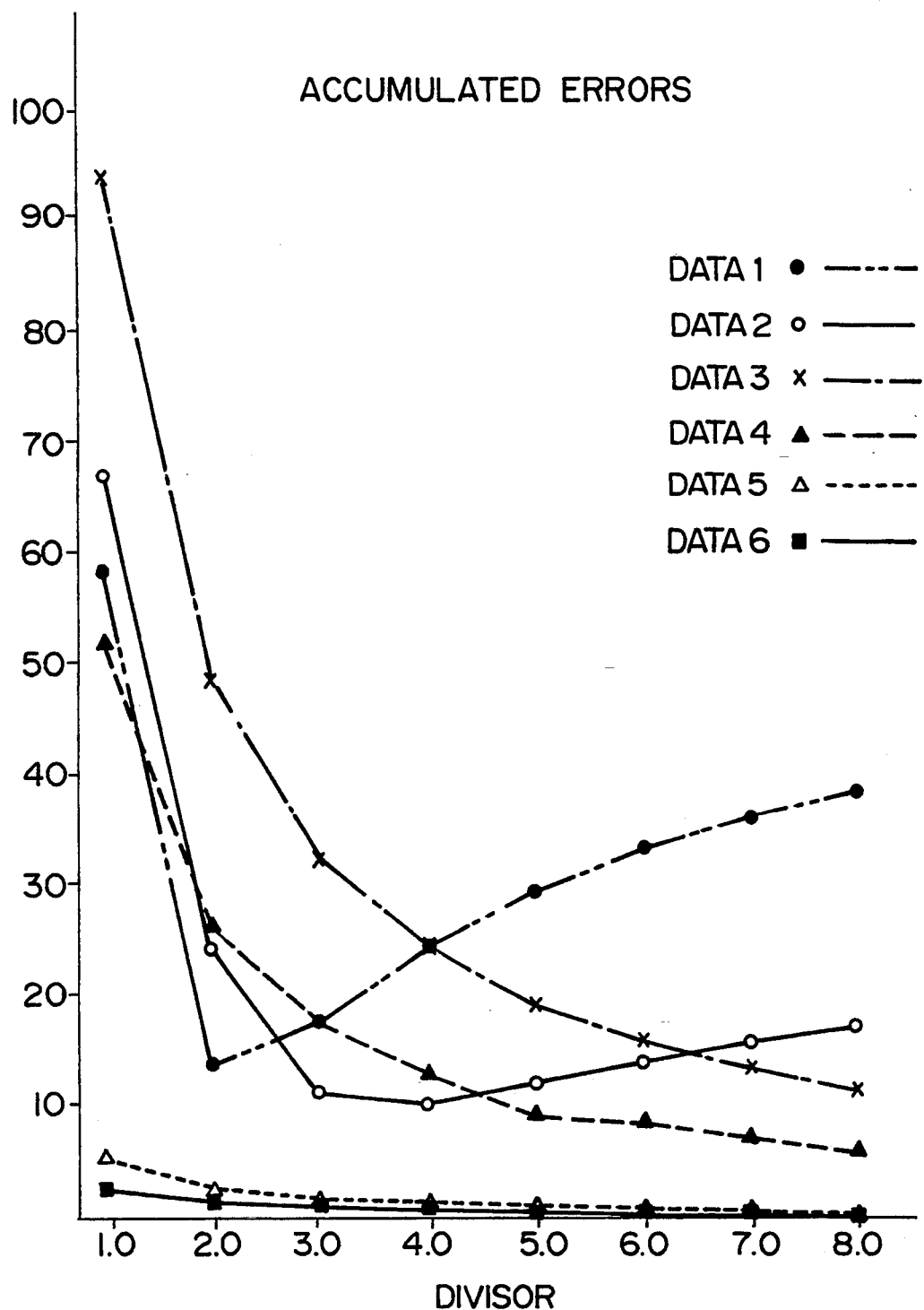

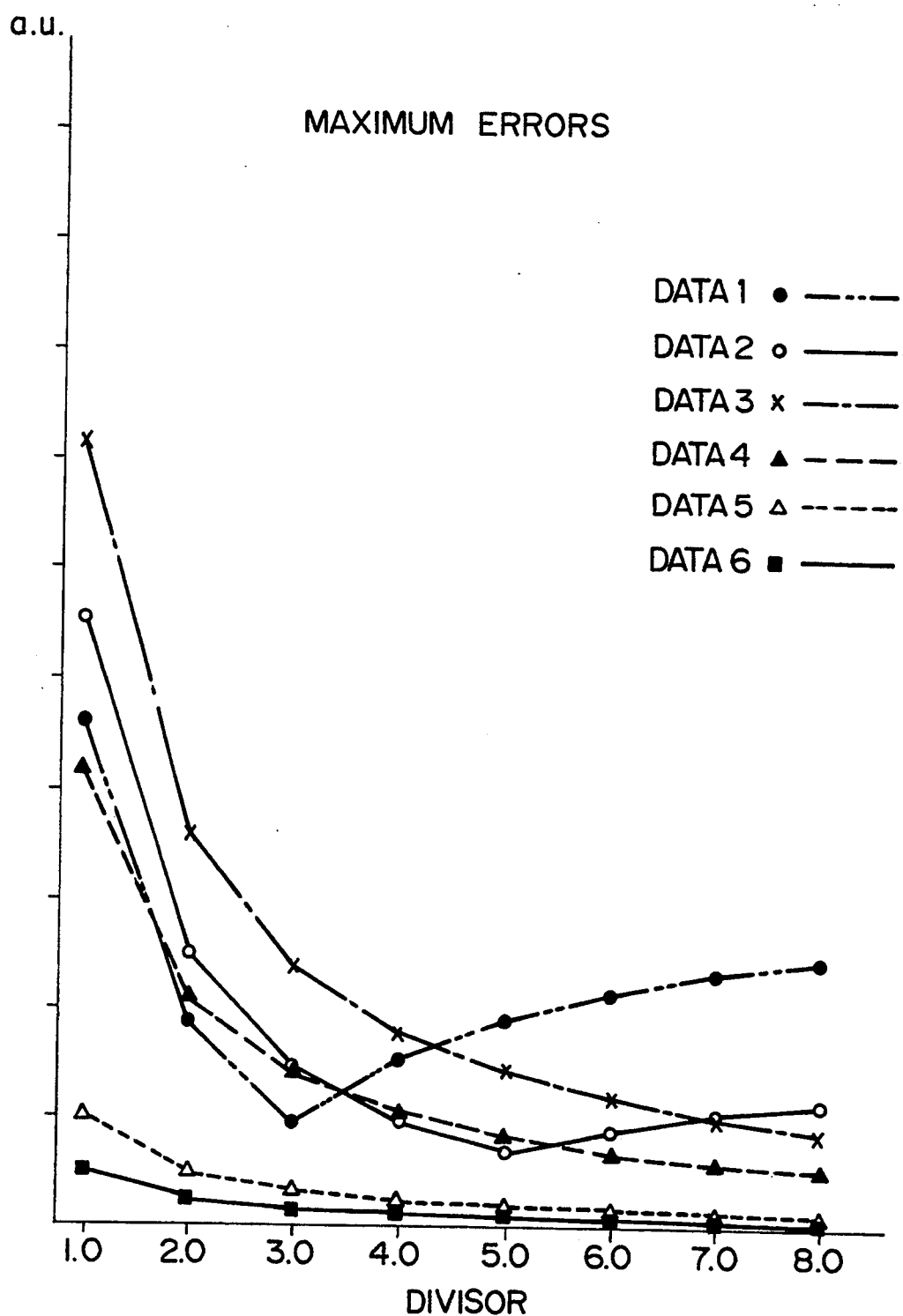

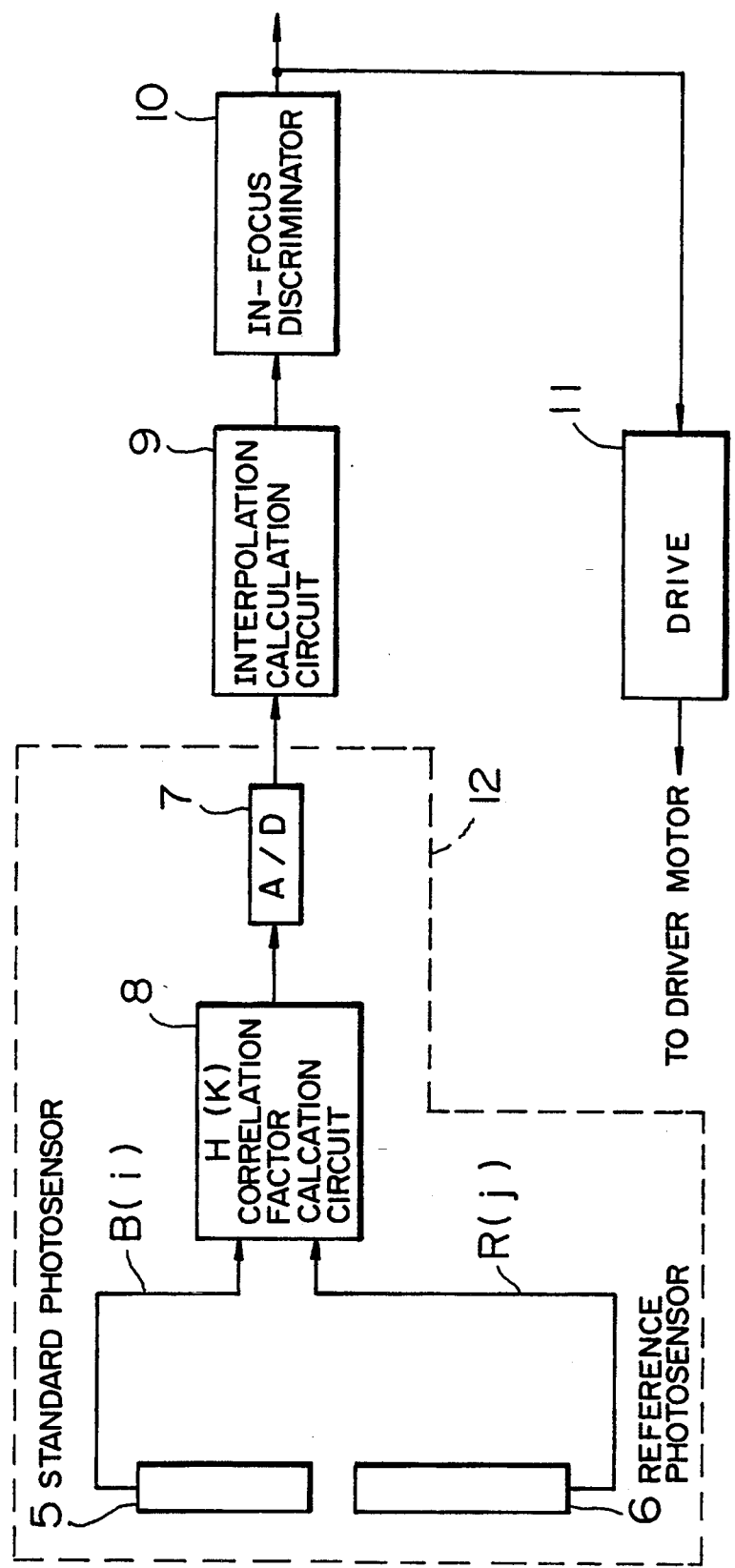

CORRELATION PHASE DIFFERENCE TYPE FOCUS DETECTING INTERPOLATION

This is a continuation of application No. 07/900,284 filed Jun. 18, 1992 now abandoned.

BACKGROUND OF THE INVENTION a) Field of the Invention

The present invention relates to a technique of distance detecting, and more particularly to a technique of distance detecting according to a phase difference detecting type for detecting the distance to an object, particularly suitable for use with image pick-up apparatuses such as cameras.

b) Description of the Related Art

A correlation type distance detecting method is known which detects a distance to an object by using the triangulation method, which is based upon the relative position of two images of the same object focused on a pair of line sensors. This method can measure a distance by a single range finding operation, and so it is suitable for use with an autofocusing camera.

FIGS. 6A and 6B show an example of a conventional TTL (through the lens), phase difference detecting type range finding device. FIG. 6A shows an example of the structure of the device, and FIG. 6B shows an example of the signal processor of the device. This device will be described as applied to a focus detecting device for a camera by way of example.

Light from an object to be picked up is converged by an imaging lens 51, passed through a film equivalent plane 52 to a separator lens 54 via a condenser lens 53. The separator lens 54 splits the incident light into two light beams and projects them onto a standard line sensor 55 and reference line sensor 56. An image of the object on the optical axis of the imaging lens 51 is transformed into two images by the separator lens 54 and focused on the line sensors 55 and 56.

The line sensor 55 has p photosensor elements and is called a standard line sensor because it is used as a standard. The line sensor 56 has q photosensor elements greater than p, and is called a reference line sensor. Image signals for p photosensor elements of the standard line sensor 55 are read at a fixed read phase, whereas image signals for p photosensor elements of the reference line sensor 56 are read at a sequentially changing read phase. The latter phase can be defined as a relative pixel position to that of the standard line sensor 55. The two image signals are compared to obtain a phase difference therebetween.

The image signals picked up from the standard and reference line sensors 55 and 56 are supplied to a signal processor 57. While sequentially changing the read phase for the image signal picked up from the reference line sensor 56, the signal processor 57 calculates a correlation factor to be described later to detect an extreme value of correlation factors, and hence a distance to an object.

Another range finding method has also been proposed, in which an external light is passed not through an imaging lens 51 but through a pair of lenses having the same characteristic and disposed respectively in front of the standard and reference line sensors, for measurement of a distance to an object.

SUMMARY OF THE INVENTION

It is an object of the present invention to provide a phase difference detecting type distance detecting device and a method capable of providing a high precision of distance detecting even if correlation factor change is symmetrical on the right and left sides of an extreme value.

According to an aspect of the present invention, in a distance detecting device wherein an image of an object is focused on a standard photosensor and reference photosensor, correlation factors are calculated while changing the phase of a reference optical signal from the reference photosensor relative to the phase of a standard optical signal from the standard photosensor, and a distance to the object is detected from a phase having an extreme value of the calculated correlation factors, the distance detecting device has correction means for correcting a shift of the correlation factors caused by different image detection areas of the standard and reference photosensors.

According to another aspect of the present invention, in a distance detecting method wherein a pair of optical systems are disposed spaced apart by a base line length in the direction perpendicular to an optical axis, the pair of optical systems having the same characteristic, a standard photosensor and a reference photosensor, are disposed on a focal plane of the pair of optical systems, the standard and reference photosensors each having a plurality of photosensor elements, an image of an object is focused onto the standard and reference photosensors, a standard optical signal from the standard photosensor is compared with a reference optical signal from the reference photosensor while changing the phase of the reference optical signal relative to the phase of the standard optical signal to calculate correlation factors, and a distance to the object is detected from a phase having an extreme value of the calculated correlation factors, one correlation factor change by a unit phase shift before the extreme value is subtracted from the other correlation factor change by the unit phase shift after the extreme value, the subtraction result is divided by a constant between 1.2 and 8.0, the division result is added to the correlation factors at sampling points adjacent the extreme value on the side of the other correlation factor change, the addition results are used as the corrected correlation factors, an interpolation calculation is performed using the corrected correlation factors to obtain a phase having an extreme value of the corrected correlation factors.

If the image detecting area of the reference photosensor is partially different from that of the standard photosensor, detection precision may be deteriorated by an image picked up only by the reference photosensor. This deterioration of detection precision can be improved through correction by the correction means.

If correlation factors are asymmetrical relative to an extreme value, correlation factor changes before and after the minimum value by a unit phase shift are detected. One correlation factor change is subtracted from the other correlation factor change. The subtraction result is divided by a constant between 1.2 and 8.0, to obtain correction values for the correlation factors near the minimum value. The correction values are added to the calculated correlation factors to obtain corrected correlation values near correlation values which would be obtained if the change of correlation values is symmetrical before and after the extreme value.

In the above manner, even if a correlation curve is asymmetrical relative to the minimum value, the correlation factors can be corrected properly through interpolation calculation, and a distance can be detected at a high precision.

BRIEF DESCRIPTION OF THE DRAWINGS

FIG. 1A is a graph showing a correlation curve, FIGS. 1B and 1C are graphs showing noise components superposed by an image not picked up by a standard photosensor, and FIG. 1D is a flow chart showing interpolation calculation for compensating noise components.

FIG. 3 is a graph showing accumulated errors obtained by simulation.

FIG. 4 is a graph showing maximum errors obtained by simulation.

FIG. 5 is a block diagram of a focus detecting device according to an embodiment of the present invention.

FIGS. 8A to 8C are diagrams explaining phase difference detection through interpolation calculation, in which FIG. 8A is a graph showing image signals picked up by a standard photosensor and reference photosensor, FIG. 8B is a bar graph of a correlation curve, and FIG. 8C is a graph explaining three-point interpolation.

DESCRIPTION OF THE PREFERRED EMBODIMENTS

The related art heretofore proposed by the present assignee will be first described in order to help understand the present invention.

Figure 7A:
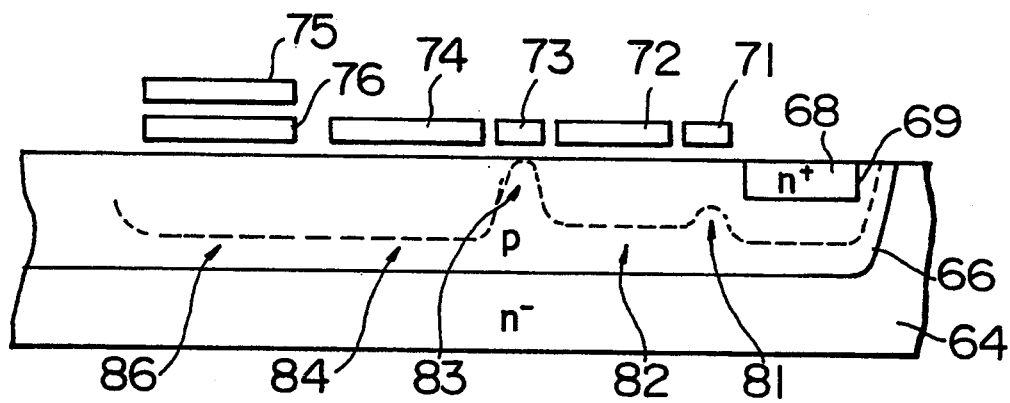
FIG. 7A is a cross sectional view of a photosensor according to the prior art.

The present assignee proposed an autofocusing device which non-destructively reads electric charges stored upon application of light and processes them directly in the form of an analog quality. FIG. 7A shows an example of the structure of a photosensor of such an autofocusing device. Referring to FIG. 7A, the photosensor is structured by forming a p-type well 66 on the surface of an n⁻-type silicon substrate 64 and forming an n⁺-type region 68 within the p-type well 66 to obtain a p-n junction 69 as a photodiode. When light is incident around the p-n junction 69, pairs of electrons and holes are formed. Electrons and holes are separated and stored in accordance with the potential gradient around the p-n junction 69.

The p-type well 66 extends to the left of the p-n junction 69 as viewed in FIG. 7A. Formed on the surface of the substrate 64 are polysilicon gate electrodes 71 to 74 and a floating gate electrode 76, respectively insulated from the p-type well 66. Formed next to the photodiode is a potential barrier 81 under the gate electrode 71. Formed next to the potential barrier 81 is a storage region 81 under the gate electrode 72.

Electric charges corresponding in amount to incident light to the photodiode and generated around the p-n junction 69, go across the potential barrier 81 to be stored in the storage region 82. The storage region 82 is contiguous, across a potential barrier 83 under the transfer gate 73, to a shift register region 84 under the gate electrode 74. The shift register region 84 is contiguous to a read region 86 under the floating gate 76 on which a bias applying control gate electrode 75 is formed.

When pairs of electrons and holes are generated in response to incident light to the photodiode, carriers go across the potential barrier 81 to be stored in the storage region 82 under the gate electrode 72, and across the potential barrier 83 under the transfer gate 73 to be transferred in the shift register region 84 under the gate electrode 74.

Electric charges stored in the shift register region 84 are transferred to the read region 86 under the floating gate electrode 76, in response to a voltage applied to the control gate electrode 75. Electric charges are induced capacitively in the floating gate 76, the amount of electric charges being dependent upon the electric charges transferred to the read region 86. In accordance with the quantity of electric charges in the floating gate 76, the incident light quantity is non-destructively read. After this read operation, carriers in the read region are returned to the shift register region 84 and shifted therein.

In the above manner, electric charges in the shift register region 84 are sequentially and non-destructively read.

For the photosensor such as shown in FIG. 7A, a switched capacitor integrator can be used to calculate an equation (1) to be described later, by using the detected signal.

Figure 7B:
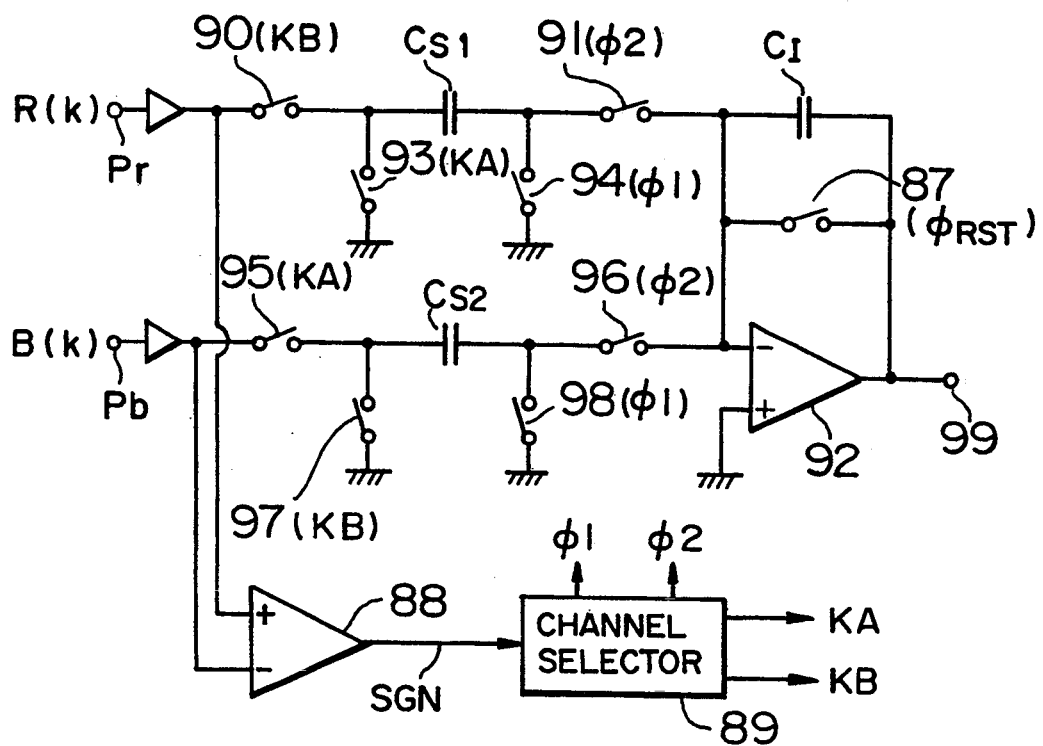
FIG. 7B is a circuit diagram showing the outline of a switched capacitor integrator.

FIG. 7B shows an example of a switched capacitor integrator.

Referring to FIG. 7B, an electric charge signal B(k) from a standard photosensor and an electric charge signal R(k) from a reference photosensor are applied to input terminals Pb and Pr of the switched capacitor integrator, respectively, and supplied via amplifiers to inverting and non-inverting input terminals of a differential amplifier 88.

The differential amplifier 88 generates a sign signal Sgn, which changes depending upon the relation of amplitude between the input signals B(k) and R(k). The sign signal Sgn is then supplied to a channel selector 89. The channel selector 89 generates pairs of select signals Φ1 and Φ2, and KA and KB, the polarities of the select signals being reversed in accordance with the sign signal Sgn.

The input terminal Pr is connected via the amplifier and switch 90 to a capacitor $C_{S1}$, the switch 90 being controlled by the select signal KB. Both the electrodes of the capacitor $C_{S1}$ are connected to switches 93 and 94 so that they can be grounded under control of the select signals KA and Φ1. The electrode of the capacitor $C_{S1}$ on the switch 94 side is connected to an inverting input terminal of an operational amplifier 92 via a switch 91 which is controlled by the select signal Φ2.

Similarly, the input terminal Pb is connected via the amplifier and switch 95 to a capacitor $C_{S2}$, the switch 95 being controlled by the select signal KA. Both the electrodes of the capacitor $C_{S2}$ are connected to switches 97 and 98 so that they can be grounded under control of the select signals KB and Φ1. The electrode of the capacitor $C_{S2}$ on the switch 98 side is connected to an inverting input terminal of the operational amplifier 92 via a switch 96 which is controlled by the select signal Φ2.

The non-inverting input terminal of the operational amplifier 92 is connected to ground.

An output terminal 99 of the operational amplifier 92 is connected back to the non-inverting terminal via a parallel connection of a capacitor $C_I$ and switch 87 which is controlled by a select signal $\Phi_{RST}$. Neither the select signals KA and KB nor the select signals $\Phi 1$ and $\Phi 2$ will not take a high level at the same time.

For example, when the select signals KB and $\Phi 1$ take the high level, the switches 90 and 94, and 97 and 98 close. The signal R(k) charges the capacitor $C_{S1}$, and the other capacitor $C_{S2}$ is grounded at both the electrodes and therefore discharged.

When the select signals KA and $\Phi 2$ become high at the next timing, the switches 91 and 93, and 95 and 96 close. The capacitor $C_{S1}$, having been grounded at its right electrode as viewed in FIG. 7B, is now grounded at its left electrode, and the right electrode is connected to the inverting input terminal of the operational amplifier 92. Therefore, the effective potential of R(k) is inverted at this time. The capacitor $C_{S2}$ is connected, via the switches 95 and 96, between the input terminal Pb and the inverting input terminal of the operational amplifier 92.

As a result, the signal B(k) is charged in the capacitor $C_{S2}$. In this manner, a voltage difference between signals R(k) and B(k) is inputted to the inverting input terminal of the operational amplifier 92.

When the relation of amplitude between the signals R(k) and B(k) is reversed, the channel selector 89 reverses the phases of the select signals KA and KB, and $\Phi 1$ and $\Phi 2$ in accordance with the sign signal Sgn.

In this case, the signal B(k) is first charged into the capacitor $C_{S2}$, and the signal B(k) is inverted in its sign and applied to the inverting input terminal of the operational amplifier 92. The signal R(k) is applied via the capacitor $C_{S1}$ to the inverting input terminal of the operational amplifier 92.

A signal corresponding to the absolute value of a voltage difference between signals B(k) and R(k) is therefore applied to the inverting input terminal of the operational amplifier 92. The sum of absolute values are calculated to obtain values of a correlation function H and detect a phase difference and hence an in-focus state.

Phase difference detection through correlation calculation will be described in detail with reference to FIGS. 8A and 8B.

Figure 8A:
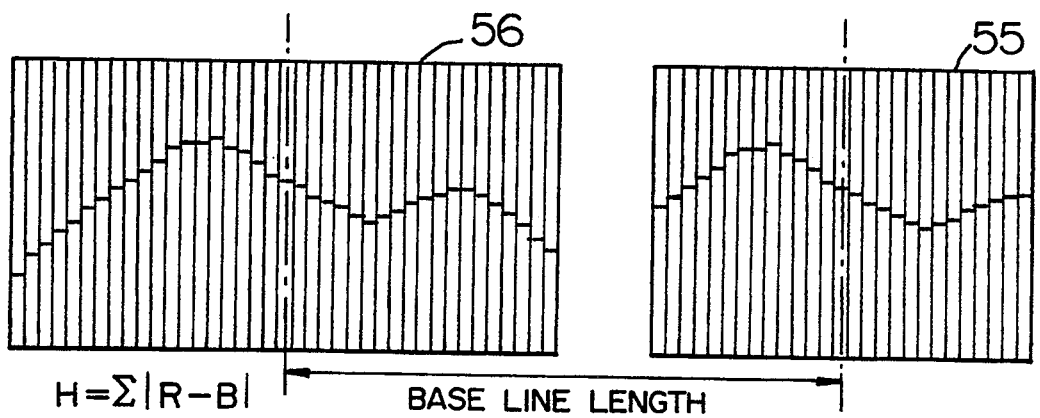
Figure 8B:
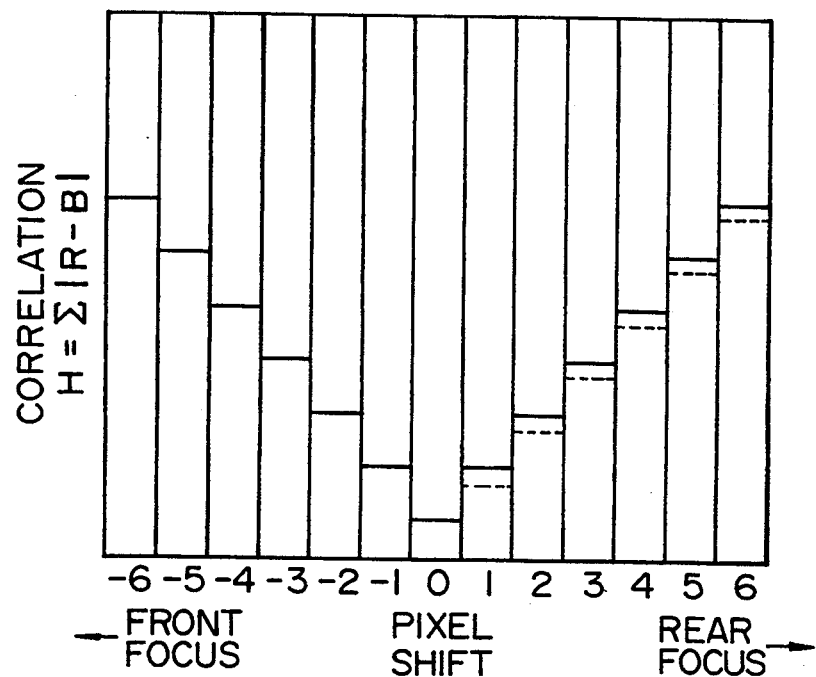

As shown in FIG. 8A, an image of an object is focused on a standard line sensor 55 by a standard line sensor lens, and another image of the object is focused on a reference line sensor 56 by a reference line sensor lens, the reference line sensor 56 being spaced apart from the standard line sensor in the horizontal direction by a base line length.

For an object at a predetermined position, the same image of the object is focused on photosensor elements of the standard and reference line sensors 55 and 56. For an object at a position different from the predetermined position, the images on the standard and reference line sensors 55 and 56 shift in the horizontal direction.

The nearer the object comes, the longer the distance between the two images becomes, and the farther the object goes, the shorter the distance becomes. In order to detect a change in distance between two images, the reference line sensor 56 has more photosensor elements than the standard line sensor 55.

Phase difference detection through correlation calculation is used for detecting a change in distance between two images.

In the phase difference detection through correlation calculation, a correlation factor for respective pairs of two images focused on the line sensors 55 and 56 is calculated by the following equation (1). The relative shift amount (phase difference) providing a minimum correlation factor is used for discriminating an in-focus state.

$$H(m) = \Sigma(k=1 \text{ to } n)\, B(K) - R(k+m) \tag{1}$$

where $\Sigma$ (k=1 to n) is a sum of functions for k=1 to k=n. Letter k stands for a k-th processor element of the line sensor 55. Letter m stands for the relative shift amount and is an integer from −6 to +6 for example.

B(k) in the above equation (1) represents an electric signal time-sequentially outputted from each pixel of the standard line sensor 55, and R(k+m) represents an electric signal time-sequentially outputted from each pixel of the reference line sensor 56. By calculating the above-equation (1) while sequentially changing m from −6 to +6, correlation factors H(−6), H(−5), ..., H(6) such as shown in FIG. 8B can be obtained.

For example, a predetermined distance to an object is preset in correspondence with a state where the correlation factor H(0) takes a minimum value. If a correlation factor other than H(0) takes a minimum value, the shift amount, i.e., a phase difference from m=0, represents a shift of an object from the predetermined position, allowing to detect a distance to the object.

Photosensor elements of the standard and reference line sensors 55 and 56 are disposed for example at a 20 μm pitch. In this case, each correlation factor is calculated at the interval of 20 μm distance on the focusing plane. If a distance to an object corresponds to an intermediate position between two adjacent photosensor elements, correlation factors on the right side of the extreme value of the correlation factors become different from those on the left side, as indicated by broken lines in FIG. 8B. In such a case, a resolution superior to the pitch distance can be obtained through interpolation calculation.

Figure 8C:
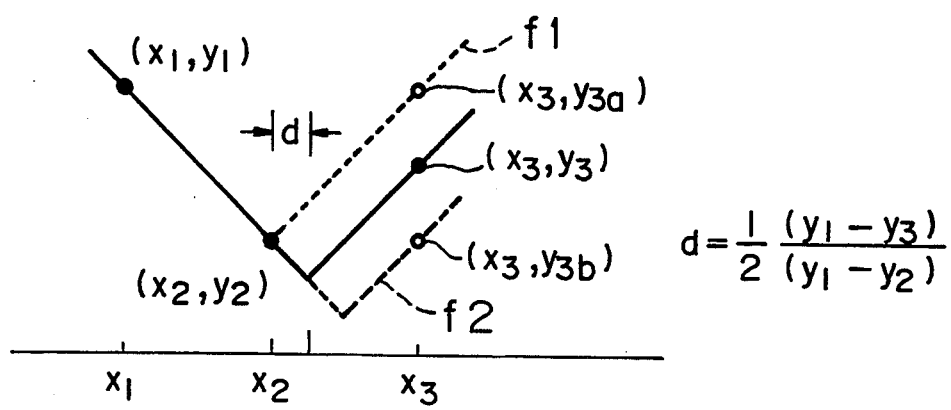

FIG. 8C is a schematic diagram illustrating a three-point interpolation method.

In FIG. 8C, symbol x2 represents a position where a minimum correlation factor is obtained, and x1 and x3 represent sampling positions on both sides of X2. Solid circles indicate calculated correlation factors.

As shown in FIG. 8C, if a correlation factor y3 at x3 is lower than a correlation factor y1 at x1, it is conceivable that an actual minimum value is present somewhere in excess of x2 toward x3. If the minimum value is correctly at x2, then a correlation factor y3a at x3 would be equal to the correlation factor y1 at x1, assuming that the correlation curve bent at x2 rises bilaterally symmetrically as indicated by a broken line f1.

If an actual minimum correlation factor is at the middle position between x2 and x3, the correlation curve bent at the middle position between x2 and x3 rises as shown in a broken line f2. In this case, a correlation factor y3b at x3 would be equal to the correlation factor y2 at x2. As seen from FIG. 8C, the difference between these two correlation factors (y3a−y3b) is equal to the difference between the correlation factors (y1−y2) at x1 and x2.

Namely, a shift by half a pitch corresponds to a change in correlation factor by an amount equal to a difference between two adjacent correlation factors. By checking the calculated correlation factors, it is possible to obtain the position having an actual minimum correlation factor, between positions x2 and x3. The shift amount d from x2 is given by:

$$d=(y1-y3)/2(y1-y2)$$

The image detecting area to be sampled by the reference line sensor is not always the same as the area to be sampled by the standard line sensor. If there is an area with great light amount variation only within the area sampled by the reference line sensor, correlation factors on the right and left sides of the minimum correlation factor will not change generally symmetrically. In such a case, the three-point interpolation assuming the bilateral symmetry of correlation factors on the right and left sides of the minimum correlation factor, cannot provide a high interpolation precision.

An embodiment of the present invention will be described with reference to FIGS. 1A to 1D. It is assumed that a correlation curve shown in FIG. 1A was obtained through correlation calculation using signals from standard and reference line sensors. Specifically, correlation factors sampled near the minimum point of the correlation curve changed in the order of $y_{-2}$, $y_{-1}$, $y_0$, $y_1$, and $y_2$, where $y_0$ is the calculated minimum correlation factor.

On the left side of the minimum correlation factor, a unit phase change corresponds to a correlation change of $y_{-2}-y_{-1}=\alpha$, and on the right side of the minimum correlation factor, a unit phase change corresponds to a correlation change of $y_2-y_1=\beta$, where $\alpha>\beta$. If the phase of an image having an even illuminance shifts, the correlation factor changes linearly as shown on the left side of the minimum correlation factor, and also on the right side as shown by a broken straight line.

Figure 1A:
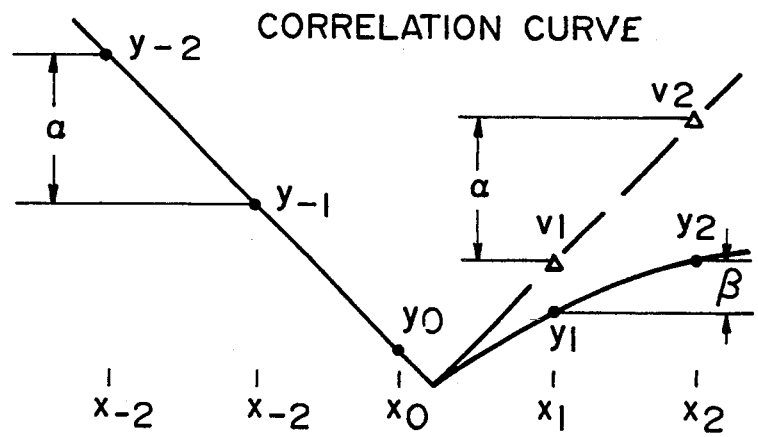
FIGS. 1A to 1D illustrate an embodiment of the present invention.
Figure 1B:
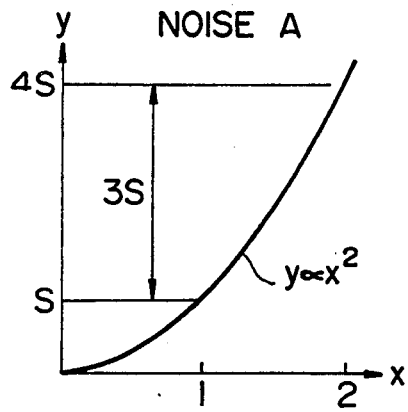

However, an actual correlation curve becomes such as shown by a solid line in FIG. 1A, because an image which will not be picked up by the standard line sensor may be picked up by the reference line sensor, or from other reasons. A method will be described below, for adjusting the correlation factor $y_1$ by using an expected correlation factor change $\alpha$ and an actual correlation factor change $\beta$, respectively by a unit phase shift.

It is assumed that noise components picked up only by the reference line sensor change as a second order function with a change of an x-direction position (phase). Assuming that noise components are superposed starting from $x_0$ position, they have values shown in FIG. 1B.

If the amount of noise components at $x_1$ is s, the amount at $x_2$ is 4s. These noise components are added to (subtracted from) the expected correlation factors $v_1$ and $v_2$, so that the actual correlation factors become $y_1$ and $y_2$. By subtracting the actual correlation factor change $\alpha$ from the correlation factor change $\beta$ without noise components, the difference of noise components at $x_1$ and $x_2$ becomes 3s.

The noise components at $x_1$ therefore are given by:

$$s=(\alpha-\beta)/3$$

Figure 1C:
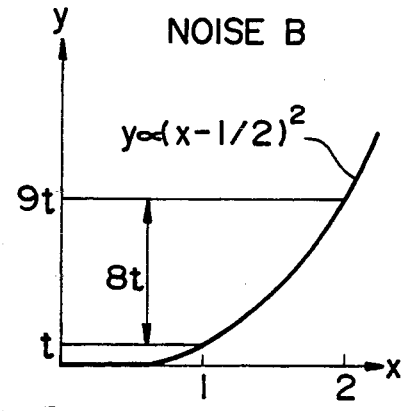

The noise components are not necessarily superposed starting from the sampled point of the minimum correlation factor. Assuming that the noise components start to be superposed from the middle point between the sample point $x_0$ corresponding to the minimum correlation factor and the next sample point $x_1$, the noise components have values as shown in FIG. 1C.

If the amount of noise components at $x_1$ is t, the amount at $x_2$ is 9t.

Therefore, the relation between the expected correlation factor change a and the actual correlation factor change $\beta$ respectively by a unit phase shift is expressed as $\alpha-\beta=8t$. The amount of noise components at $x_1$ is accordingly given by:

$$t=(\alpha-\beta)/8$$

It is not possible to know a point of the correlation curve from which noise components start to be superposed. How noise components can be compensated properly for various types of noise superpositions was studied from the following simulation.

Figure 2:
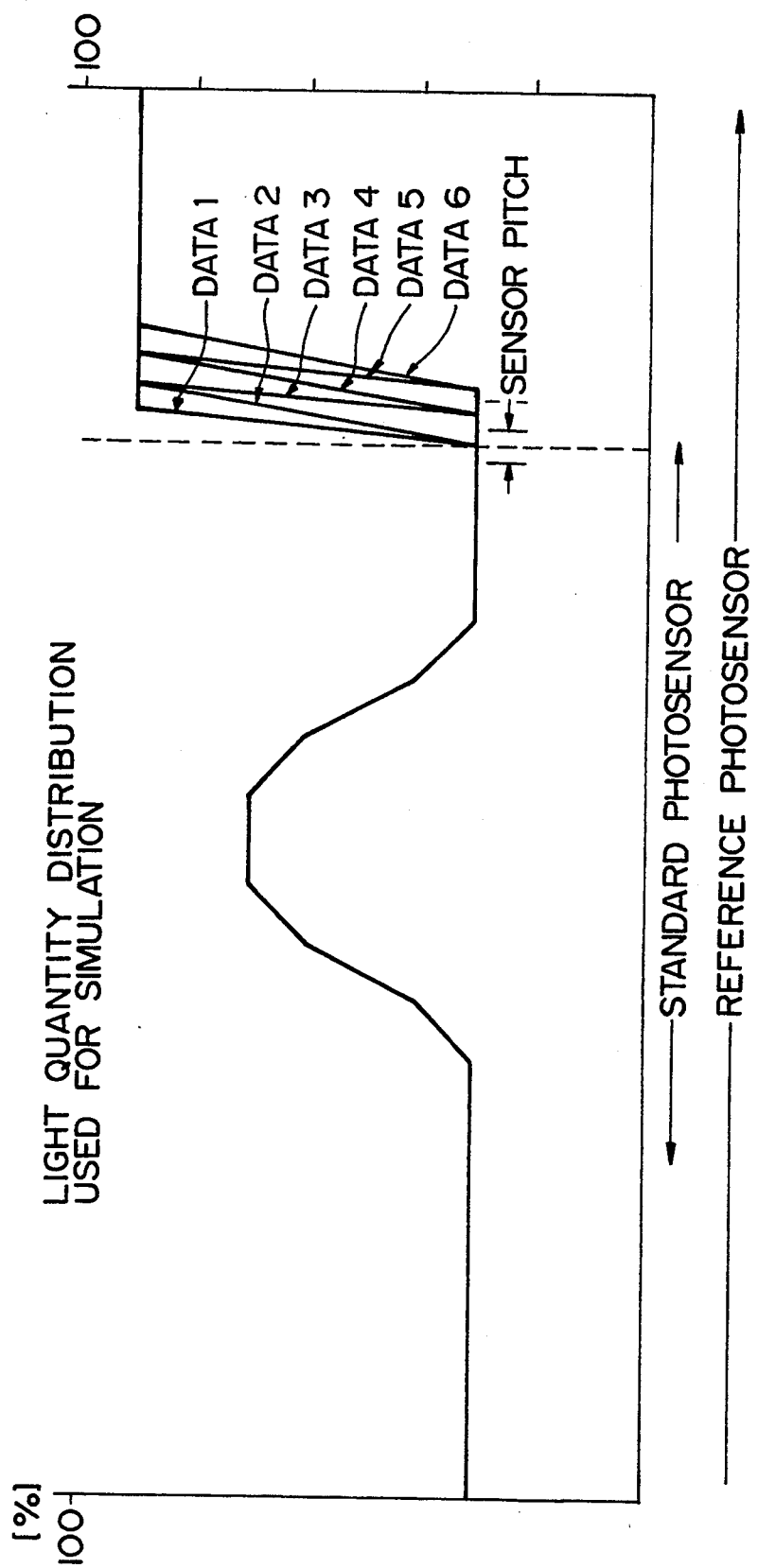
FIG. 2 is a graph showing waveforms of a sensor output used for simulation.
Figure 6A:
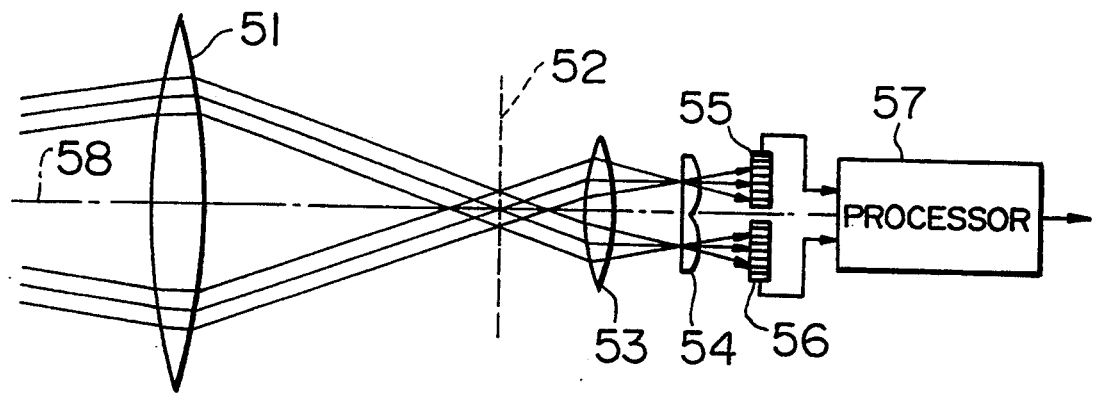
FIG. 6A is a schematic diagram showing an example of the structure of a conventional distance detecting device.
Figure 6B:
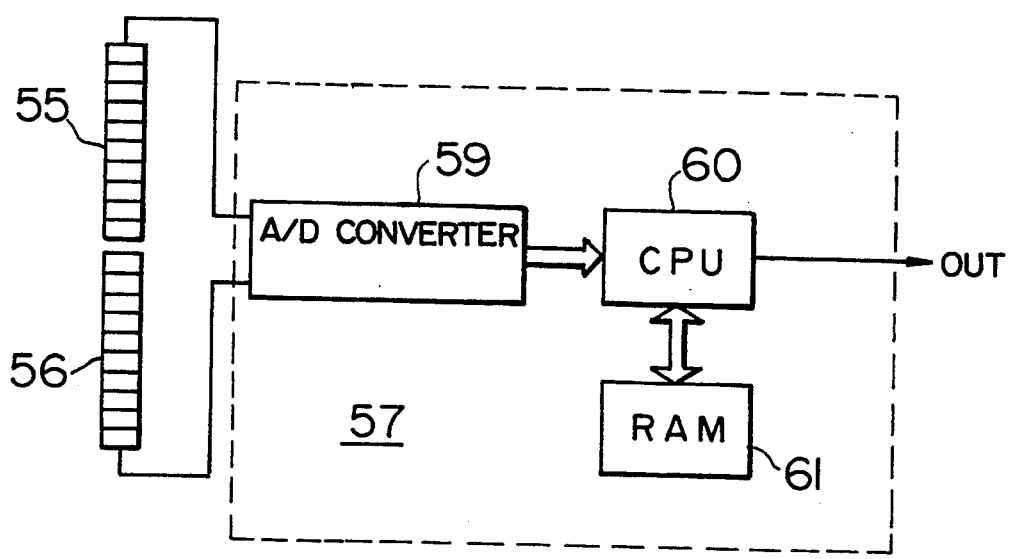
FIG. 6B is a block diagram of the processor shown in FIG. 6A.

FIG. 2 shows an example of a waveform of light quantity distribution used for the simulation. In this example, the standard line sensor picks up an image having a bump at the central area thereof, whereas the reference line sensor picks up from a wider area an image including that picked up by the standard line sensor as well as a noise component image having a steep rise at the right side of the image area.

Six types of noise components distribution were considered, including DATA1 to DATA6. The pitch between DATA1 (DATA2), DATA3 (DATA4) and DATA5 (DATA6) is the same as the pitch of the sensor elements. For example, each rising point of these DATA1 to DATA6 corresponds to the center of the standard photosensor. An image on the reference line sensor was changed at twenty five steps from $-12/25$ phase to $+12/25$ phase relative to the image on the standard line sensor. The divisor used for dividing a difference between two correlation factor changes by a unit phase shift and for cancelling noise components, was selected from a wide range [1, 8] including the above-described divisors 3 and 8.

Accordingly, 25*8=220 calculations were made for each DATA. Thus, 200*6=1200 data were obtained for six DATA1 to DATA6. From these data, simulation errors were obtained.

FIGS. 3 and 4 show accumulated errors and maximum errors. Each accumulated error shown in FIG. 3 is an accumulation of errors representing differences between a set phase difference and a calculated phase difference, using twenty five set phase differences. It is important to make an accumulated error as small as possible.

FIG. 4 shows each maximum error at an arbitrary unit, the errors being given herein for comparison purpose.

As apparent from FIGS. 3 and 4, DATA5 and DATA6 have a small error, and so they influence less. An infinite divisor corresponds to no noise compensation. It is therefore important that to what extent the error is reduced as compared with an infinite divisor.

DATA1 and DATA2 will have a significant accumulated error, not corrected (divider$\simeq\infty$). The effect of compensation can be positively recognized by setting the divisor between about 1.2 or larger and about 8 or smaller. A good result can be obtained by setting the divisor between about 2.0 and 8.0. A better result can be obtained by setting the divisor between about 2.5 or larger and about 5.0 or smaller. It is preferable therefore that the divisor is set to a constant between 1.2 and 8.0. More preferably, it is set within a range between 2.0 and 8.0. Still more preferably, it is set within a range between 2.5 and 5.0.

Figure 1D:
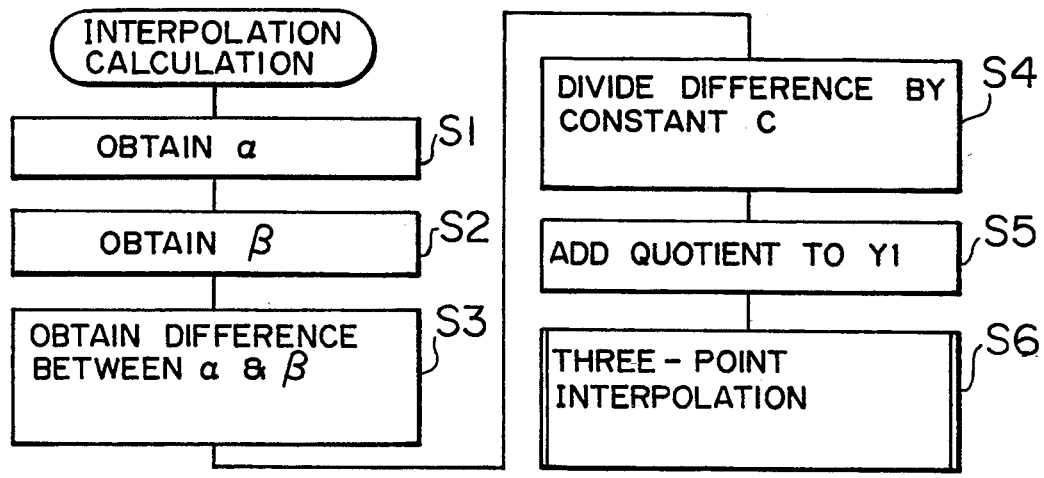

FIG. 1D is a flow chart showing interpolation calculation. At step S1, there is obtained a correlation factor change by a unit phase shift near the minimum value on one side of a correlation curve. At step S2, there is obtained another correlation factor change $\beta$ by a unit phase shift near the minimum value on the other side.

At step S3, there is obtained a difference between the correlation factor changes $\alpha$ and $\beta$. At the next step S4, the obtained difference is divided by a constant c.

At step S5, a quotient obtained through division is added to a correlation factor $y_1$. At step S6, the compensated correlation factor $v_1$ and other correlation factors $y_{-1}$ and $y_0$ are used for three-point interpolation to obtain a phase with a minimum correlation factor.

For DATA3 to DATA6, a good result can be obtained without compensation.

For these data, the number of sampling points may be set not to 5 but to 7, and interpolation is carried out using seven point data.

Compensation calculation may be stopped by providing detection means. For example, compensation calculation is carried out only when the light change amount of pixel data adjacent the image area of the standard line sensor is large.

Alternatively, the difference $\alpha - \beta$ is first calculated to compare the difference with a threshold value Th. Only when $\alpha - \beta > Th$, compensation calculation is carried out, and when $\alpha - \beta \leq Th$, it is not carried out but an ordinary three-point interpolation only is carried out. In this manner, a better result can be obtained.

FIG. 5 is a block diagram of a focus detecting device performing such interpolation calculation. Image signals B(i) and R(i) from a standard line sensor 5 and reference line sensor 6 are supplied to a correlation factor calculation circuit 8 for calculation of correlation factors.

A calculated correlation factor H(k) for each phase is converted into a digital signal by an A/D converter 7 and supplied to an interpolation calculation circuit 9. This circuit 9 carries out an interpolation calculation if the correlation curve is bilaterally symmetrical relative to a minimum value. If the correlation curve is bilaterally asymmetrical relative to a minimum value, the above-described correlation compensation is carried out and thereafter an interpolation calculation is carried out.

An obtained phase with a minimum correlation factor is supplied to an in-focus discriminator 10 to discriminate an in-focus. A signal representing an in-focus is supplied from the in-focus discriminator 10 to a driver circuit 11 to supply a controlled current to a camera lens driver motor.

In the above manner, the focal length of the camera is adjusted. The line sensors 5 and 6, correlation factor calculation circuit 8 and A/D converter 7 are integrated on a single semiconductor chip 12.

In the above embodiment, the description has been given for a correlation factor curve which changes linearly on one side of a minimum value, and changes non-linearly on the other side with a second order function being added thereto, and the non-linearly changing side is subject to compensation. If the correlation factor change of the non-linearly changing side is greater than that of the linearly changing side, the correlation factor on the linearly changing side may be compensated to realize a bilaterally symmetrical correlation factor curve. In this case also, similar interpolation calculation described above is carried out. From experiments, a better result was obtained by compensating the smaller correlation factor change side. Also, the correlation factor may change non-linearly on both sides of the extreme value.

The present invention has been described in connection with the preferred embodiments. The present invention is not limited only to these embodiments. It is apparent from those persons skilled in the art that various modifications, improvements, combinations and the like are possible.

We claim:

1. A distance detecting method comprising the steps of:

disposing a pair of optical systems spaced apart by a base line length in the direction perpendicular to an optical axis;

disposing a standard photosensor and a reference photosensor on a focal plane of said pair of optical systems, said standard and reference photosensors each having a plurality of photosensor elements;

focusing an image of an object onto said standard and reference photosensors, comparing a standard optical signal that is output by said standard photosensor with a reference optical signal that is output by said reference photosensor while changing the phase of said reference optical signal relative to the phase of said standard optical signal, and calculating correlation factors;

detecting a phase having an extreme value of said correlation factors, wherein correlation factors occur before and after said extreme value;

calculating a first correlation factor change value representing a rate of change of said correlation factors occurring before said extreme value and a second correlation change value representing a rate of change of said correlation factors occurring after said extreme value;

calculating a compensation value based on the rate of changes of the correlation factors occurring before and after said extreme value by comparing said first and second correlation factor change values;

correcting at least one of said correlation factors in accordance with said compensation value and producing at least one corrected correlation factor; and performing an interpolation calculation based on at least one of said correlation factors and said at least one corrected correlation factor, and obtaining a phase having an extreme value based on a result of said interpolation calculation.

2. A distance detecting method according to claim 1, wherein said steps of calculating a compensation value and correcting comprise the steps of subtracting one of said first and second correlation factor change values from the other correlation factor change value, dividing said subtraction result by a constant between 1.2 and 8.0, adding said division result to said correlation factors at sampling points adjacent said extreme value on the side of said other correlation factor change value, and using said addition results as said corrected correlation factors.

3. A distance detecting method according to claim 2, wherein said one of said first and second correlation factor change values is obtained by using said extreme value of said calculated correlation factors.

4. A distance detecting method according to claim 2, wherein said one of said first and second correlation factor change values is on the side having a larger absolute value of said correlation factor change value.

5. A distance detecting method according to claim 2, wherein said constant is between 2.0 and 8.0.

6. A distance detecting method according to claim 5, wherein said constant is between 2.5 and 5.0.

7. A distance detecting method according to claim 1, further comprising the step of discriminating the magnitude of difference in said correlation factor change values on both sides of an extreme value of the correlation factor and performing interpolation directly on the calculated correlation factor when the difference is below a threshold value.

8. A distance detecting device comprising:
a standard processor and reference photosensor disposed on a reference plane and each having a plurality of phases for focusing two images of an object;
a correlation factor calculation circuit for calculating correlation factors while changing the phase of a reference optical signal that is output by said reference photosensor relative to the phase of a standard optical signal that is output by said standard photosensor;
correction means for correcting a shift of said correlation factors caused by different image detecting areas of said standard and reference photosensors, including means for calculating first and second correlation factor change values representing a rate of change of said correlation factors, means for calculating a compensation value based on the calculated rate of change by comparing said first and second correlation factor change values, and means for correcting at least one of said correlation factors in accordance with said compensation value and producing at least one corrected correlation factor; and
an in-focus discriminating circuit for performing an interpolation calculation based on at least one of said correlation factors and said corrected correlation factors, and for detecting a phase having an extreme value based on the results of said interpolation calculation so as to detect a distance to said object.

9. A distance detecting device according to claim 8, wherein said correction means comprising a discriminator for discriminating whether said shift is to be corrected or not.

10. The distance detecting method as recited in claim 1, wherein said interpolation calculation is based on four or more correlation factors including at least one said corrected correlation factor.

11. The distance detecting device as recited in claim 8, wherein said in-focus discriminating circuit performs said interpolation calculation on four or more correlation factors including at least one of said corrected correlation factors.

12. The distance detecting device as recited in claim 8, further comprising means for detecting a phase having an extreme value by comparing said correlation factors, wherein correlation factors occur before and after said extreme value.

* * * * *